United States Patent [19]

Tanaka

[11] Patent Number: 5,777,819
[45] Date of Patent: *Jul. 7, 1998

[54] MAGNETIC TAPE CASSETTE

[75] Inventor: Masato Tanaka, Tokyo, Japan

[73] Assignee: Sony Corporation, Tokyo, Japan

[ * ] Notice: The term of this patent shall not extend beyond the expiration date of Pat. No. 5,228,636.

[21] Appl. No.: 820,704

[22] Filed: Mar. 18, 1997

Related U.S. Application Data

[60] Continuation of Ser. No. 366,987, Dec. 30, 1994, abandoned, which is a division of Ser. No. 186,823, Jan. 26, 1994, Pat. No. 5,432,668, which is a continuation of Ser. No. 955,918, Oct. 2, 1992, abandoned, which is a continuation of Ser. No. 622,781, Dec. 6, 1990, abandoned.

[30] Foreign Application Priority Data

Dec. 6, 1989 [JP] Japan .................. 1-141175 U

[51] Int. Cl.$^6$ .................. G11B 15/68; G11B 23/04; G11B 23/087
[52] U.S. Cl. .................. 360/92; 360/132
[58] Field of Search .................. 360/92, 132

[56] References Cited

U.S. PATENT DOCUMENTS

| | | | |
|---|---|---|---|
| 4,974,102 | 11/1990 | Hamachi et al. | 360/92 |
| 5,126,898 | 6/1992 | Kamuro et al. | 360/92 |
| 5,228,636 | 7/1993 | Tanaka | 360/85 |
| 5,432,668 | 7/1995 | Tanaka | 360/132 |

FOREIGN PATENT DOCUMENTS 0295921  12/1988  European Pat. Off. .

Primary Examiner—Robert S. Tupper
Attorney, Agent, or Firm—Jay H. Maioli

[57] ABSTRACT

A recording and/or reproducing apparatus employs a magazine holding a number of small-size micro-cassettes retaining magnetic tape. The tape cassette has a pivotable lid that includes a cut-away portion that cooperates with an engagement portion of a tape cassette withdrawing member that is part of the recording and/or reproducing apparatus, so that any of the tape cassettes can be withdraw from the magazine.

3 Claims, 5 Drawing Sheets

MAGNETIC TAPE CASSETTE

This application is a continuation of application Ser. No. 08/366,987 filed Dec. 30, 1994, now abandoned, which is a division of application Ser. No. 08/186,823 filed Jan. 26, 1994, now U.S. Pat. No. 5,432,668, which is a continuation of application Ser. No. 07/955,918 filed Oct. 2, 1992, now abandoned, which is a continuation of application Ser. No. 07/622,781 filed Dec. 6, 1990, now abandoned.

BACKGROUND OF THE INVENTION

1. Field of the Invention

The present invention generally relates to magnetic tape cassettes and, more particularly, is directed to a structure for withdrawing a magnetic tape cassette from a cassette magazine in which a plurality of magnetic tape cassettes are accommodated.

2. Description of the Prior Art

So far extremely small magnetic tape cassettes have been proposed, which are smaller than a magnetic tape cassette (i.e. so-called compact cassette or micro-cassette) now available on the market.

An outer dimension of such extremely small tape cassette is extremely small and there is then the risk that, if it is reserved alone, it will be lost. Therefore, it is proposed that a plurality of these extremely small magnetic tape cassettes are accommodated within a cassette magazine and reserved.

Upon recording or reproduction, these magnetic tape cassettes are inserted into and loaded onto a recording and reproducing apparatus under the condition such that they are accommodated within the cassette magazine. In the recording and reproducing apparatus, a predetermined magnetic tape cassette is automatically taken out from the cassette magazine by a cassette changer of the recording and reproducing apparatus, and the thus selected magnetic tape cassette is loaded on a driving mechanism section of the recording and reproducing apparatus, thereby the recording and/or reproduction being performed.

The conventional magnetic tape cassette, however, is not arranged so that it can be taken out from the cassette magazine. Accordingly, such magnetic tape cassette cannot be taken out from the cassette magazine with ease, which brings about a difficult problem in realizing a magnetic tape cassette automatic loading system by a cassette changer.

OBJECTS AND SUMMARY OF THE INVENTION

Accordingly, it is an object of the present invention to provide an improved magnetic tape cassette which can eliminate the aforenoted shortcomings and disadvantages encountered with the prior art.

More specifically, it is an object of the present invention to provide a magnetic tape cassette which is accommodated within a cassette magazine in a plural form and which can be taken out from the cassette magazine by a cassette changer with ease.

It is another object of the present invention to provide a magnetic tape cassette which can be applied to the existing tape cassette without large modifications.

It is a further object of the present invention to provide a magnetic tape cassette which can be applied to a variety of tape cassettes such as a PCM recording tape cassette, a video tape cassette, a DAT (digital audio tape) cassette or the like.

As an aspect of the present invention, a magnetic tape cassette is arranged such that it is accommodated in a cassette magazine in a plural form and taken out from the cassette magazine by a cassette changer upon use. This magnetic tape cassette is comprised of an engaging portion formed on a front portion of the cassette casing, the engaging portion being engaged with an withdrawing member of the cassette changer.

The above, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

An embodiment of a magnetic tape cassette according to the present invention will hereinafter be described in detail with reference to FIGS. 1 to 6. In this embodiment, the magnetic tape cassette is constructed as an extremely small tape cassette.

Figure 1:
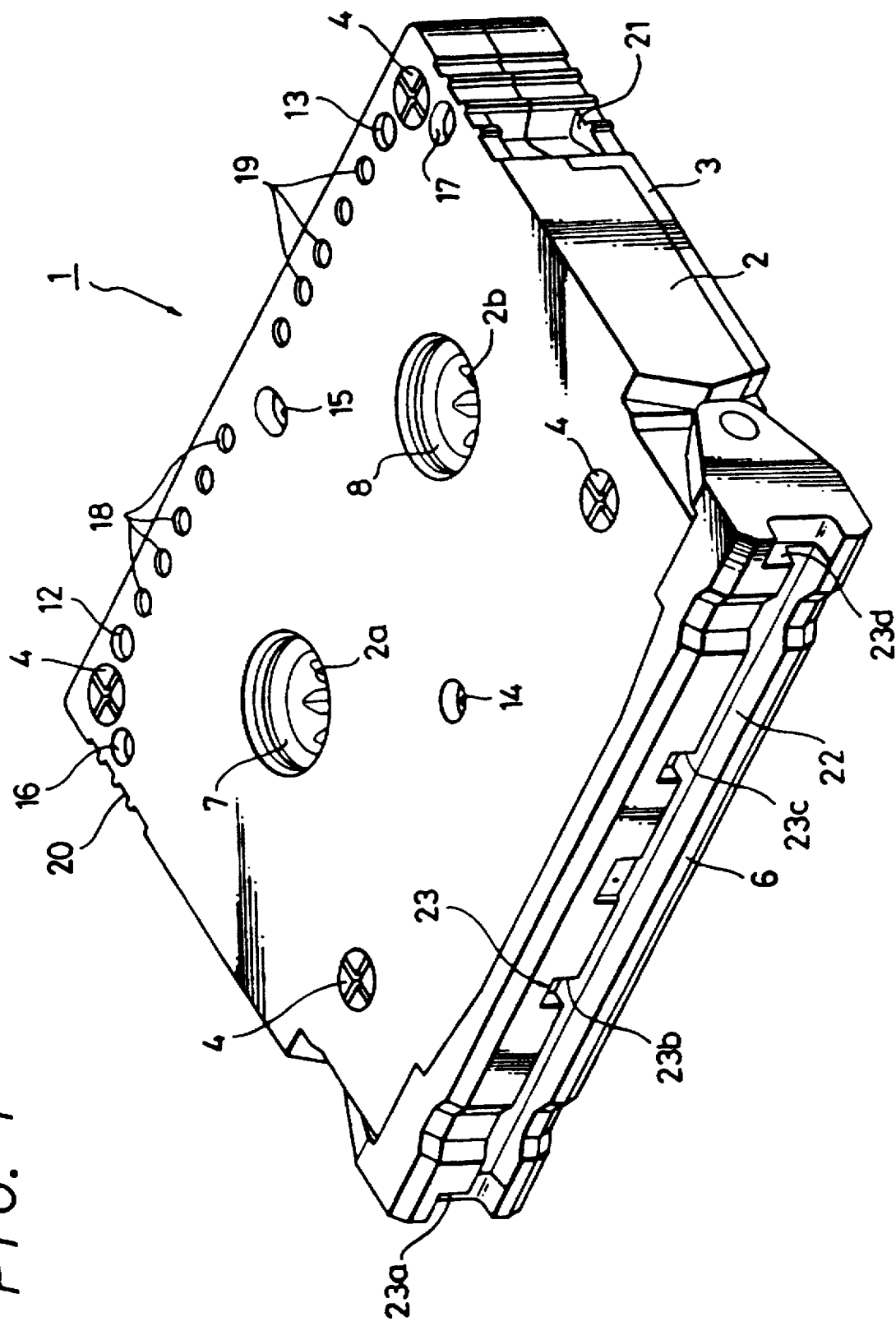
FIG. 1 is a perspective view of an embodiment of a magnetic tape cassette according to the present invention.
Figure 2:
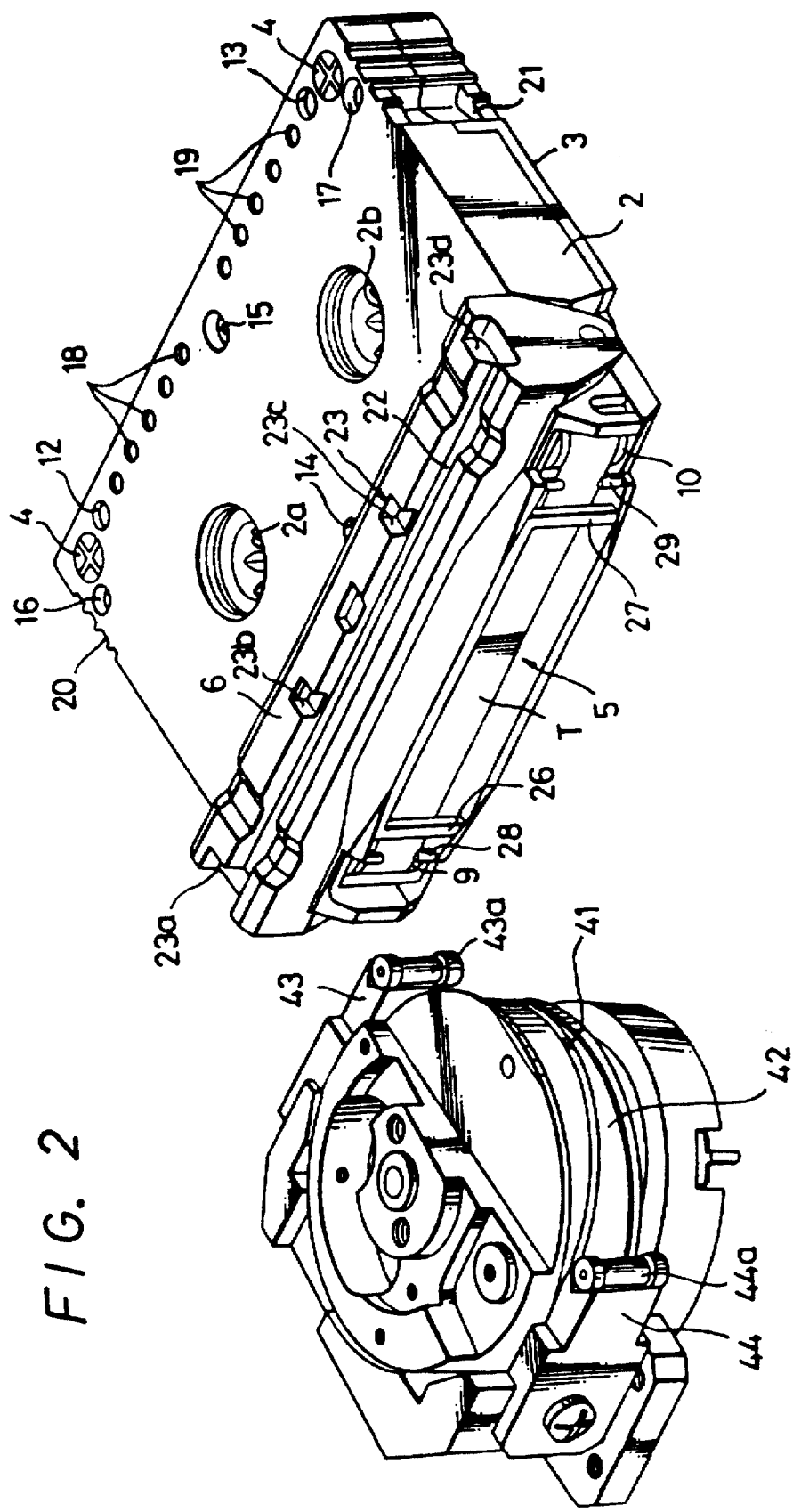
FIG. 2 is a perspective view illustrating the magnetic tape cassette and a head drum, and to which references will be made in explaining a relationship therebetween.
Figure 3:
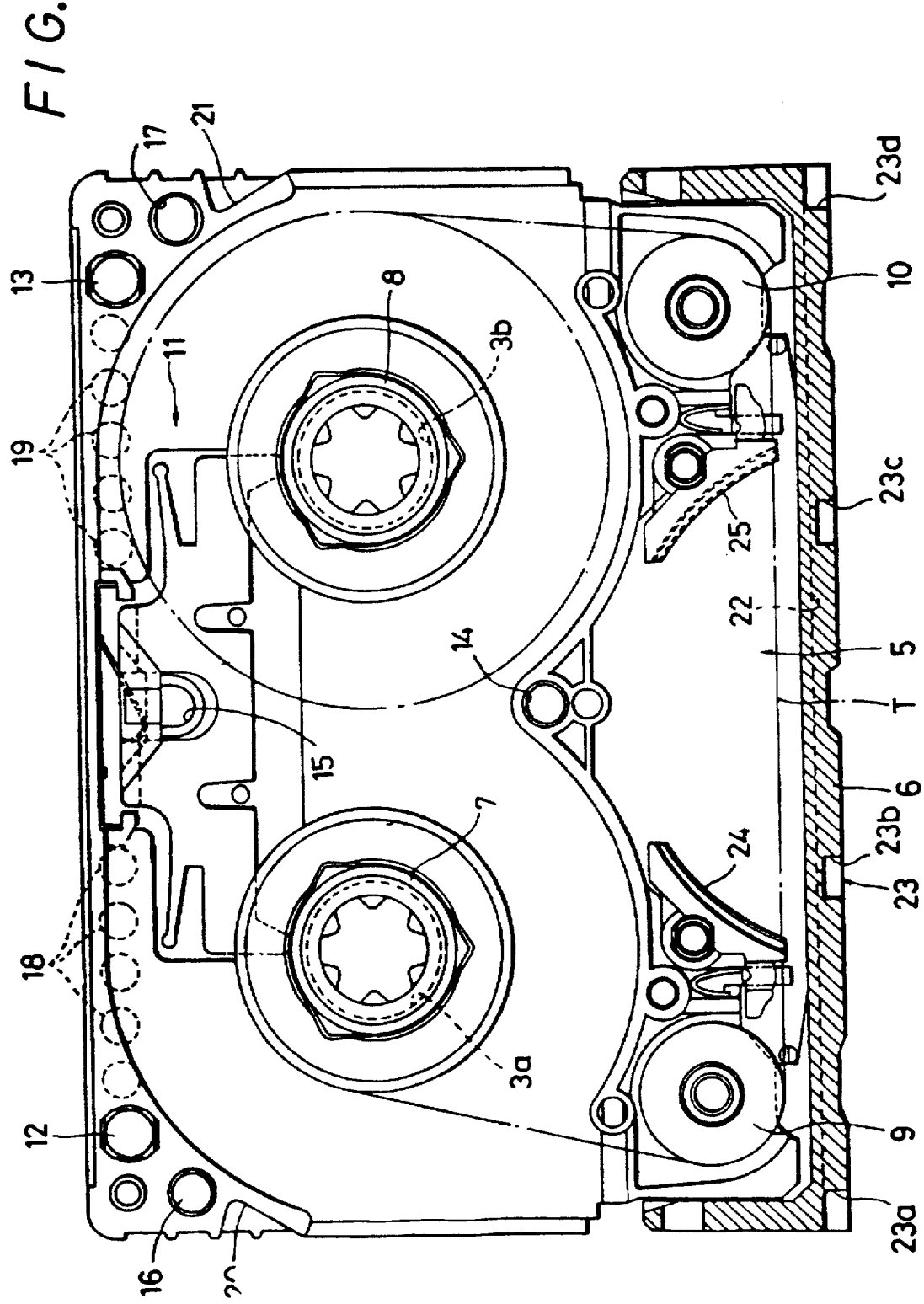
FIG. 3 is a plan view of a lower part side of the magnetic tape cassette of FIG. 1.

In FIGS. 1 to 3, reference numeral 1 generally designates a cassette casing which accommodates therein a magnetic tape T on which a PCM (pulse code modulated) signal, for example, is recorded and from which the recorded PCM signal is reproduced. The cassette casing 1 is formed of an upper half or upper part 2 and a lower half or lower part 3 fastened together by screws 4. A lid 6 is pivotally attached to the cassette casing 1 so as to open and close an opening portion 5 formed at the front surface side of the upper and lower parts 2 and 3.

The magnetic tape T is accommodated within the cassette casing 1, i.e. between the upper and lower parts 2 and 3 under the condition such that the magnetic tape T is wrapped around a pair of reel hubs 7 and 8 provided in correspondence with hub drive shaft insertion apertures 2a, 2b and 3a, 3b. One portion of the magnetic tape T is exposed to the front surface side opening portion 5 via pinch rollers 9 and 10 serving as guide rollers pivotally provided at both sides of the opening portion 5 such that the magnetic tape T is extended between the guide rollers 9 and 10.

As shown in FIG. 3, a braking mechanism 11 is provided within the cassette casing 1 to brake the two hubs 7 and 8 when this tape cassette is not in use. Mis-erase preventing mechanisms 12 and 13 are provided through the upper and lower surface sides of the cassette casing 1 at its two rear corner portions so as to communicate with the upper and lower parts 2 and 3. Positioning reference apertures 14, 15 and 16, 17 are respectively formed through the cassette casing 1 at its front and back positions in the front to back direction and at its two rear side portions in the lateral direction. A plurality of predetermined detection apertures 18 and 19 are formed through the cassette casing 1 at its rear edge portion in the lateral direction. Further, grip portions 20 and 21 are formed on the rear portions of two side walls of the cassette casing 1.

As illustrated in FIGS. 1 and 2, a changer engaging portion 23 is formed along a guide groove 22 extending along the lateral direction of the lid 6 which opens and closes the front surface side opening portion 5 of the cassette casing 1.

In the tape cassette constructed as described above, the magnetic tape T accommodated within the cassette casing 1 is recorded and/or reproduced by a rotary head according to the helical scan system.

More specifically, as shown in FIG. 2, a rotary head 41 is rotated at a predetermined slant angle relative to a head drum 42, and the head drum 42 is partly inserted into the front surface side opening portion 5 which is opened by rotating the lid 6 of the cassette casing 1 in the upper or lower direction. The magnetic tape T extended across the opening portion 5 is slidably moved so as to be wound around the insertion side peripheral surface of the head drum 42. Thus, when the rotary head 41 is rotated, slant tracks are formed so as to cross the magnetic tape T.

In this embodiment, in order to ensure that magnetic tape T is brought in slidable contact with the head drum 41 in a helical fashion, as shown in FIG. 3, a pair of tape guide members 24 and 25 whose guide portions are inclined in the opposite direction are disposed in the insertion portion of the opening portion 5 of the cassette casing 1 for the head drum 42 at their positions inside the guide rollers 9 and 10 such that they can be vibrated and moved in the lateral direction in an opposing fashion. When the head drum 42 is inserted into the opening portion 5, the tape guide members 24 and 25 come in contact with the peripheral surface of the head drum 42, and guide the magnetic tape T under the condition that the magnetic tape T is sandwiched between the tape guide members 24, 25 and the peripheral surface of the head drum 42.

Further, as shown in FIG. 2, the head drum 42 has at its both side portions formed wing guides 43 and 44 which are inserted into the spaces between the pinch rollers 9, 10 and the tape guide members 24, 25 in both side portions of the opening portion 5 of the cassette casing 1. Rollers 43a and 44a are mounted on the front end portions of the two wing guides 43 and 44, respectively and brought in slidable contact with the magnetic tape T, urging the magnetic tape T against the tape guide members 24 and 25.

As shown in FIG. 2, both the wing guides 43 and 44 are inserted into the opening portion 5 of the cassette casing 1 such that they are positioned in the spaces between supporting elements 26, 27 provided near the inside of the opening portion 5 and tape projection preventing guide protrusions 28, 29 positioned between the supporting elements 26, 27 and the pinch rollers 9, 10.

The thus constructed magnetic tape cassette is constructed as the extremely small type as set forth so that there is the risk that, if this magnetic tape cassette is used alone, it will be lost. Thus, when not in use, a plurality of the magnetic tape cassettes are accommodated within the cassette magazine which will be referred to later and are placed in the preservation state.

The lid 6, which opens and closes the opening portion 5, is modified such that the magnetic tape cassette can be accurately accommodated within the cassette magazine and a desired tape cassette can be taken out therefrom with ease.

More specifically, the guide groove 22 provided on the front wall of the lid 6 is formed with a displacement toward one of the upper and lower sides (toward the lower side in this embodiment) from the central portion of the lid 6 in the lateral direction. This guide groove 22 is adapted to restrict the direction in which the magnetic tape cassette is inserted into the cassette magazine, as will be described later.

The engaging portion 23 formed along the guide groove 22 is used to withdraw the magnetic tape cassette from the cassette magazine. In this embodiment, this engaging portion 23 is composed of first to fourth cutaway portions 23a, 23b, 23c and 23d which are formed between two end portions of the lid 6 along the guide groove 22 in the lateral direction. To be more concrete, the first and fourth cutaway portions 23a and 23d are formed at left and right end portions of the front surface of the lid 6 so as to be opened at the side surfaces of the lid 6. Between the two cutaway portions 23a and 23d, the second and third cutaway portions 23b and 23c are formed at the front central portion of the lid 6. These four cutaway concave portions 23a, 23b, 23c and 23d are formed at a substantially equal spacing.

Figure 4:
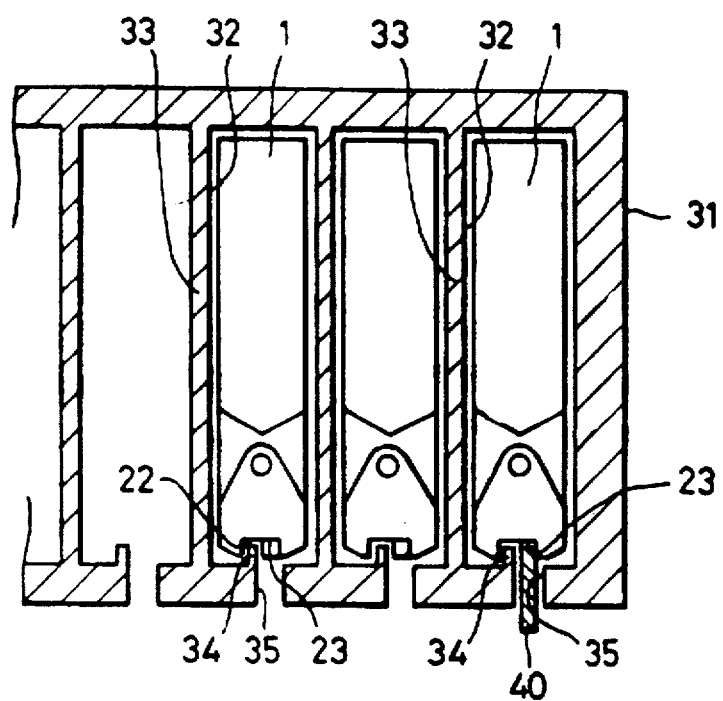
FIG. 4 is a diagrammatic view of a section of a cassette magazine to which the present invention is applied.

FIG. 4 shows an example of a cassette magazine 31.

Referring to FIG. 4, this cassette magazine 31 is provided with a plurality of accommodating portions 32 into which the magnetic tape cassettes 1 are loaded in the lateral direction. These accommodating portions 32 are isolated by partition walls 33, respectively. An engaging protrusion 34 is formed on the bottom portion of each of the accommodating portions 32 so as to be extended in the depth direction. When the magnetic tape cassette 1 is accommodated within the accommodating portion 32, the guide groove 22 of the lid 6 is engaged with the engaging protrusion 34.

In the loading of the magnetic tape cassette 1 into the accommodating portion 32 of the cassette magazine 31, the guide groove 22 of the lid 6 is deviated from the central portion of the lid 6 so that, if the magnetic tape cassette 1 is reversed and loaded into the accommodating portion 32 of the cassette magazine 31 in the opposite direction, the guide groove 22 cannot be opposed to the engaging protrusion 34 accurately, thereby the magnetic tape cassette 1 being prevented from being loaded into the accommodating portion 32 of the cassette magazine 31 in the opposite direction.

A slit 35 is formed on the bottom portion of each of the accommodating portions 32 along the engaging protrusion 34, and a withdrawing arm of a cassette withdrawing apparatus, which will be later referred to, is inserted into this slit 35.

A plurality of magnetic tape cassettes accommodated within the thus constructed cassette magazine are loaded onto a recording and reproducing apparatus under the condition that they are accommodated within the cassette magazine. Within the recording and reproducing apparatus, a desired magnetic tape cassette is automatically taken out from the cassette magazine by a cassette changer system of the recording and reproducing apparatus, and the recording and reproduction are performed.

The cassette changer system of the recording and reproducing apparatus will be explained with reference to FIG. 5.

Figure 5:
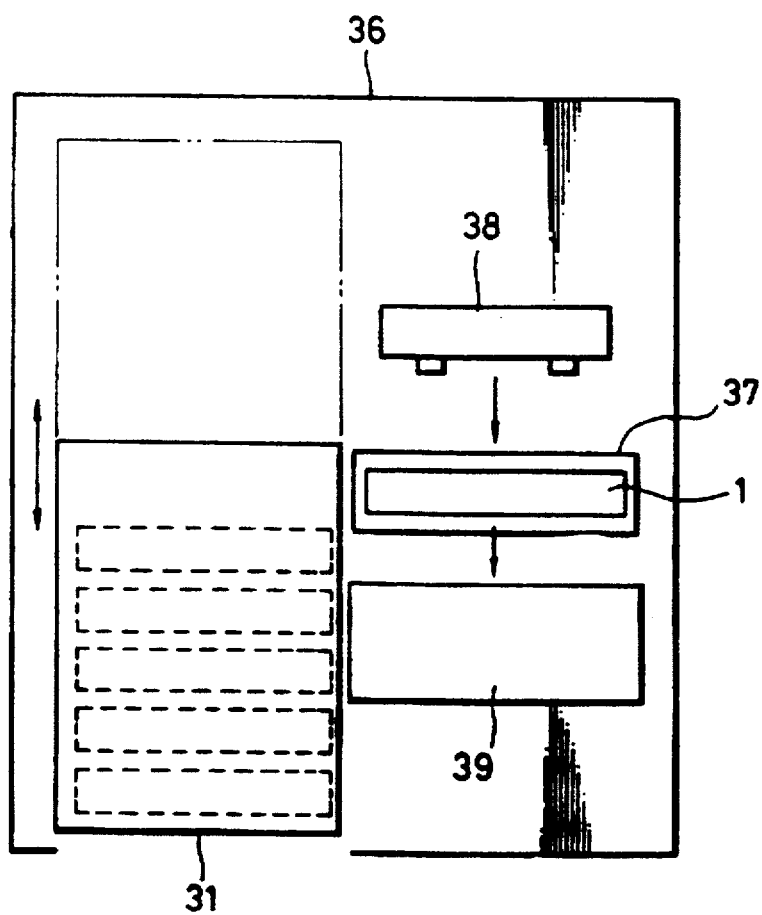
FIG. 5 is a schematic diagram of a cassette changer system to which the present invention is applied.

In FIG. 5, reference numeral 36 generally designates a recording and reproducing apparatus. When the cassette magazine 31 in which a plurality of magnetic tape cassettes are accommodated is inserted into this recording and reproducing apparatus 36, the cassette magazine 31 is moved by a predetermined moving mechanism (not shown) and one magnetic tape cassette is withdrawn from the designated accommodating portion 32 by a withdrawing apparatus 37. When the tape cassette 1 is withdrawn from the cassette magazine 31, the magnetic tape cassette 1 is carried to a driving mechanism section 39 by a moving apparatus 38 and loaded onto the driving mechanism section 39. In this driving mechanism section 39, the aforementioned rotary head 41 is inserted into the opening portion 5 of the magnetic tape cassette 1, whereby the predetermined recording or reproduction is performed.

The cassette withdrawing apparatus 37 for withdrawing the magnetic tape cassette 1 from the cassette magazine 31 in the cassette changer system is arranged as shown in FIG.

Figure 6:
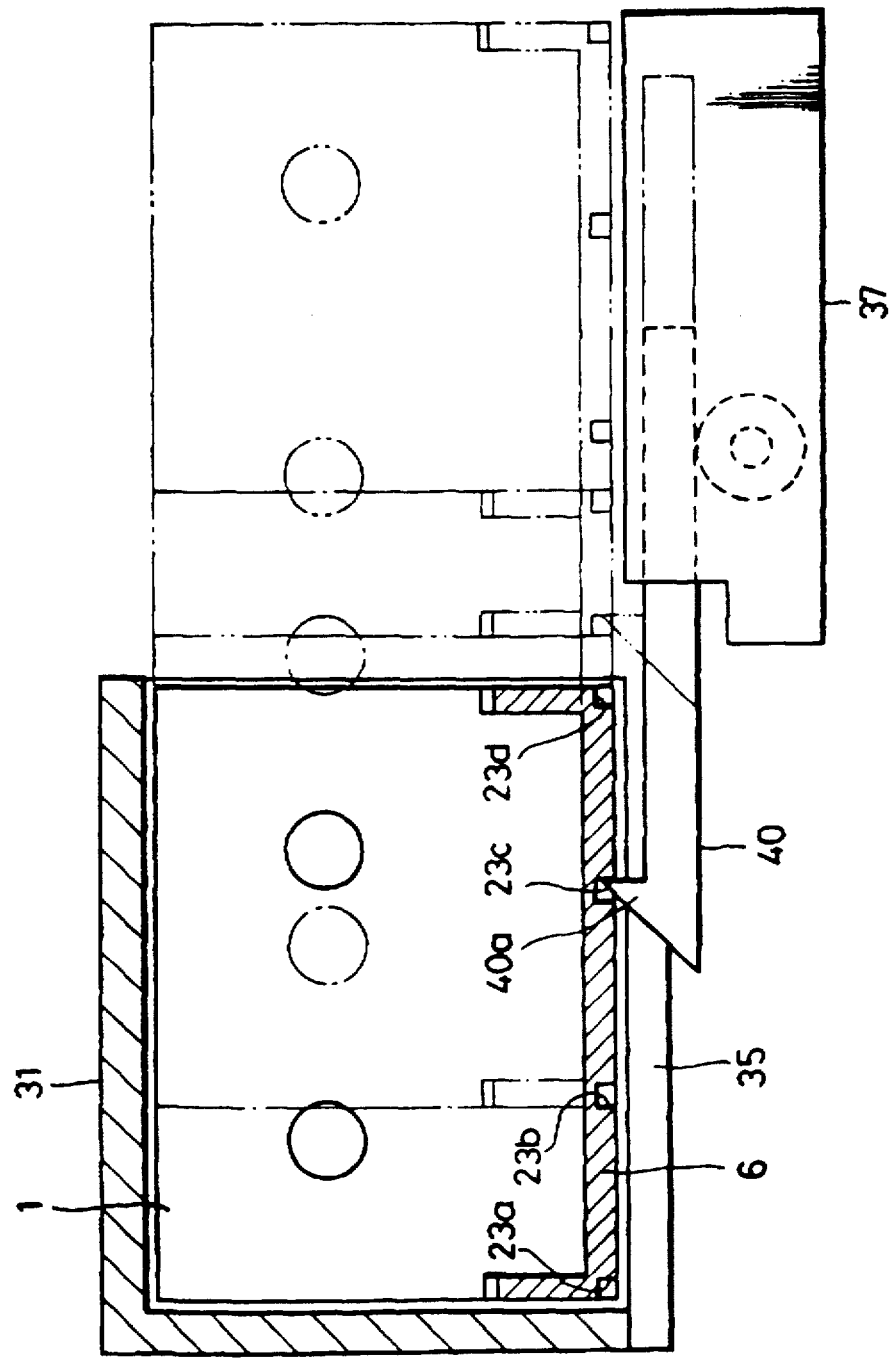
FIG. 6 is a schematic diagram used to explain an operation in which the magnetic tape cassette is taken out from the cassette magazine.

6. As shown in FIG. 6, this cassette withdrawing apparatus 37 is provided with a withdrawing arm 40, and the withdrawing arm 40 has formed at a top portion thereof a ratchet-shaped engaging nail portion 40a which is engaged with the engaging portion 23 of the lid 6 only in the direction in which the magnetic tape cassette 1 is withdrawn from the cassette magazine 31. When the cassette withdrawing arm 40 is reciprocated, its engaging nail portion 40a is engaged with the engaging portion 23 of the magnetic tape cassette 1, thereby the magnetic tape cassette 1 being withdrawn from the cassette magazine 31.

In this embodiment, the magnetic tape cassette 1 can be withdrawn from the cassette magazine 31 by reciprocating the withdrawing arm 40 by a small stroke a plurality of times. More specifically, by the first reciprocation of the withdrawing arm 40, the engaging nail portion 40a is engaged with the third cutaway portion 23c of the engaging portion 23 to withdraw the magnetic tape cassette 1 from the cassette magazine 31 by about ⅓ of the entire magnetic tape cassette. By the second reciprocation of the withdrawing arm 40, the engaging nail portion 40a is engaged with the second cutaway portion 23b of the engaging portion 23 to withdraw the magnetic tape cassette 1 from the cassette magazine 31 by about ⅓ of the entire magnetic tape cassette 1. Then, in the third reciprocation of the withdrawing arm 40, the engaging nail portion 40a is engaged with the first cutaway portion 23a of the engaging portion 23, whereby the entire arrangement of the magnetic tape cassette 1 is withdrawn from the cassette magazine 31.

The magnetic tape cassette 1 thus withdrawn from the cassette magazine 31 is carried to the driving mechanism section 39 by the moving apparatus 38 of the cassette changer system, thereby the recording or reproduction being performed.

In the magnetic tape cassette 1 of this embodiment, since the engaging portion 23 to be engaged with the withdrawing arm 40 of the cassette changer is formed on the front surface of the lid 6, the magnetic tape cassette 1 can be withdrawn from the cassette magazine 31 with ease, and can be applied to the cassette changer system.

In this embodiment, the engaging portion 23 is formed of a plurality of cutaway portions 23a, 23b, 23c and 23d arranged in the lateral direction of the lid 6 at substantially equal spacing so that the stroke of one reciprocation of the withdrawing arm 40 can be reduced, thus making it possible to withdraw the magnetic tape cassette 1 from the cassette magazine 31 by a plurality of strokes. Therefore, the withdrawing apparatus 37 can be miniaturized, which can make the overall system of the cassette changer system small in size.

Since the engaging portion 23 is formed on the lid 6, the present invention can be applied to the conventional magnetic tape cassette without large changes from a design standpoint.

More specifically, if the engaging portion 23 is provided in the cassette casing 1 side instead of the lid 6, a magnetic tape accommodating space and the locations of various detection holes or the like must be varied in a wide variety of portions because the spacing of the cassette casing 1 is very restricted, which provides a very difficult design. In this embodiment, since the engaging portion 23 is provided at the so-called vacant spacing of the front surface of the lid 6, the designing of the cassette casing 1 is not affected at all and the lid 6 may be modified very slightly. Therefore, the present invention can be effected with ease.

While the present invention is applied to the extremely small magnetic tape cassette for recording a PCM signal as described above, the present invention is not limited thereto and can be applied to a variety of tape cassettes, for example, a video tape cassette, a DAT (digital audio tape) cassette or the like.

As set out above, according to the present invention, since the engaging portion to be engaged with the withdrawing member of the cassette changer is provided on the lid rotatably provided at the front portion of the cassette casing of the magnetic tape cassette, the magnetic tape cassette can be taken out from the cassette magazine with ease. Further, since this engaging portion is provided on the lid which is rotatably provided at the front portion of the cassette casing, the present invention can be applied to the existing magnetic tape cassette without large modifications from a design standpoint.

Having described a preferred embodiment of the invention with reference to the accompanying drawings, it is to be understood that the invention is not limited to that precise embodiment and that various changes and modifications could be effected by one skilled in the art without departing from the spirit or scope of the novel concepts of the invention as defined in the appended claims.

I claim as my invention:

1. A cassette magazine and a plurality of cassettes for use with a cassette changer having a withdrawing member, comprising:

a cassette magazine having a plurality of accommodating portions, each said accommodating portion having a bottom wall with a slit formed therethrough for insertion thereinto of a withdrawing member of a cassette changer; and a plurality of magnetic tape cassettes adapted to be respectively accommodated in said plurality of accommodating portions of said cassette magazine and to cooperate with the withdrawing member inserted into said slit so that each cassette can be withdrawn from said cassette magazine during use, each of said magnetic tape cassettes being of a predetermined size and having front and rear portions spaced apart in a front-to-back direction and left and right portions spaced apart in a lateral direction, and including a lid pivotally attached to said front portion; and a plurality of cut-away portions formed on a front portion of said lid, each of said cut-away portions having straight sides in said front-to-back direction for engagement with the withdrawing member, so that any of said cassettes with said respective lid adjacent said bottom wall can be withdrawn from said cassette magazine.

2. Recording and/or reproducing apparatus according to claim 1 wherein said plurality of engaging portions are formed of four cut-away portions linearly spaced apart from one another by equal distances and sequentially engageable by said withdrawing member.

3. Recording and/or reproducing apparatus according to claim 1 wherein said cassette magazine is formed with an engaging protrusion and said lid is formed with a guide groove elongate in the lateral direction, said guide groove cooperating with said engaging protrusion for guiding each of said magnetic tape cassettes as it is inserted into and withdrawn from said cassette changer and each of said magnetic tape cassettes being asymmetrical in said lateral direction so that it can be inserted into said cassette changer by first feeding one but not the other of said left and right portions into said cassette changer.

\* \* \* \* \*